Sept. 10, 1946.  A. R. FORSYTH  2,407,228
WATER SOFTNER
Filed Dec. 7, 1943  3 Sheets-Sheet 1

Inventor
ALEXANDER R. FORSYTH
By
Attorneys

Sept. 10, 1946.  A. R. FORSYTH  2,407,228
WATER SOFTNER
Filed Dec. 7, 1943  3 Sheets-Sheet 3

Inventor
ALEXANDER R. FORSYTH

By
*Clarence A. O'Brien
and Harvey B. Jacobson*
Attorneys

Patented Sept. 10, 1946

2,407,228

UNITED STATES PATENT OFFICE 2,407,228

WATER SOFTENER

Alexander R. Forsyth, Los Angeles, Calif.

Application December 7, 1943, Serial No. 513,272

3 Claims. (Cl. 210—24)

The present invention relates to new and useful improvements in water softeners, particularly for use in conjunction with various types of domestic water heaters, and has for its primary object to provide a device of this character comprising a novel construction, combination and arrangement whereby the softening agent may be expeditiously and thoroughly regenerated.

Other objects of the invention are to provide a water softener of the aforementioned character which will be comparatively simple in construction, strong, durable, highly efficient and reliable in operation, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 3:
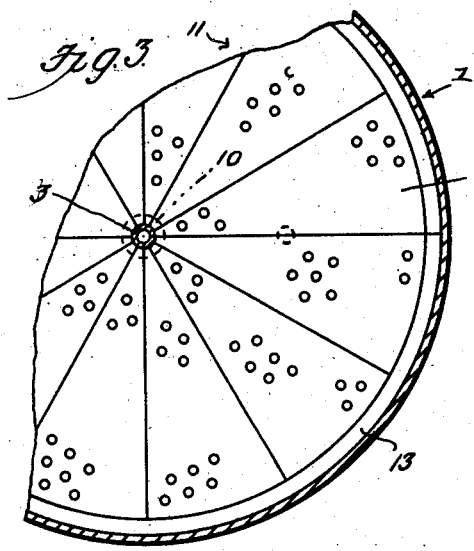
Figure 3 is a fragmentary view in horizontal section through the device.
Figure 1:
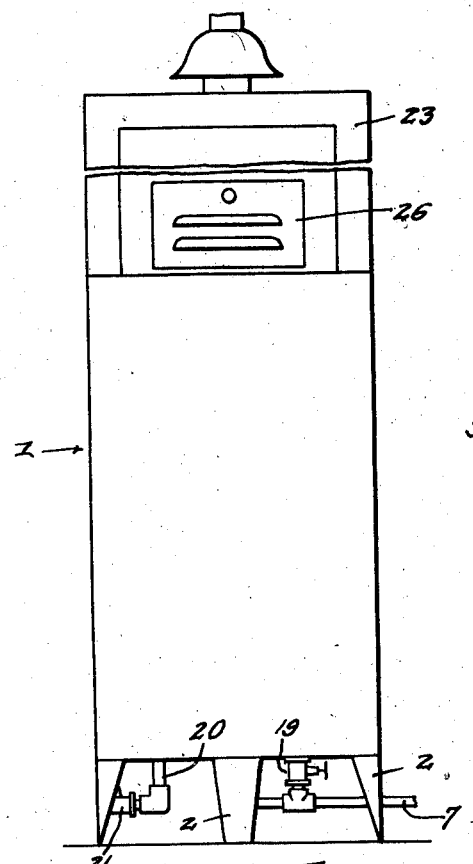
Figure 1 is an elevational view of a water softener constructed in accordance with the present invention, showing a water heater mounted thereon.
Figure 2:
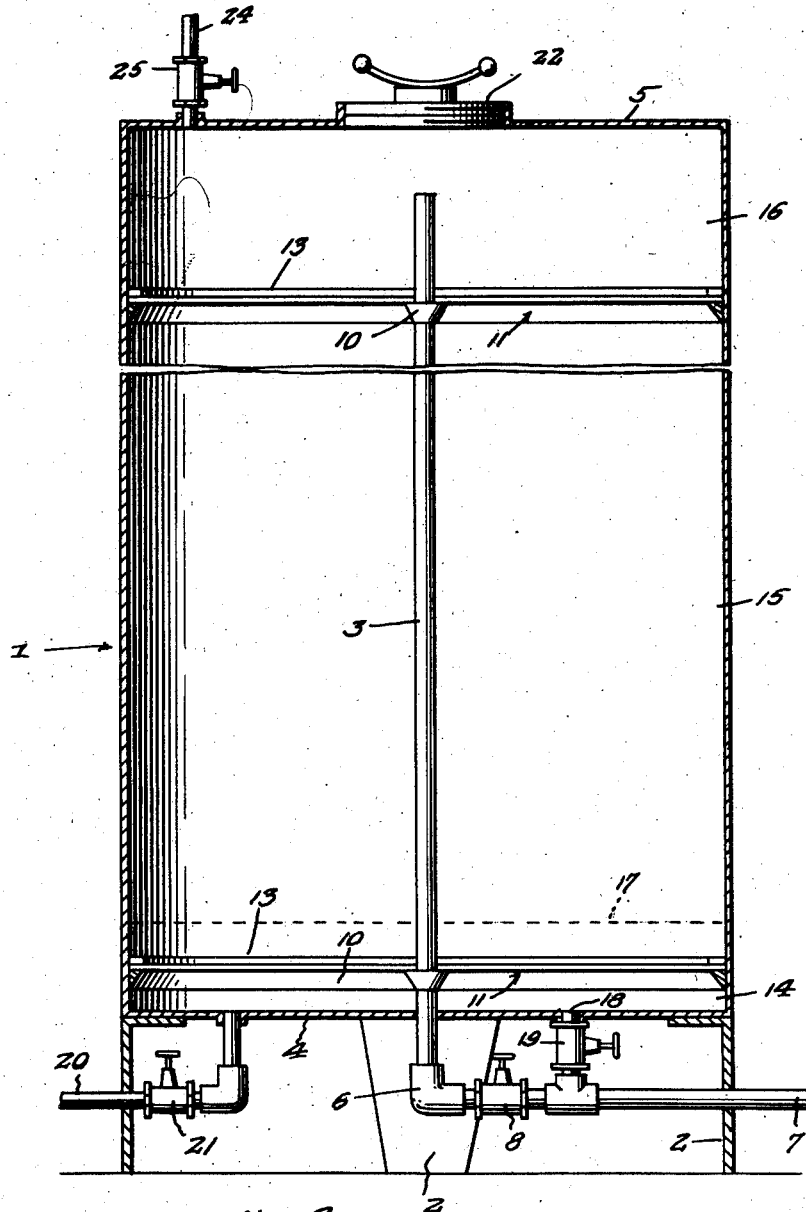
Figure 2 is a view in vertical section through the the water softener.

Referring now to the drawings in detail, and to Figures 1, 2 and 3 thereof in particular, it will be seen that reference character 1 designates generally a cylindrical tank of suitable material and dimensions, said tank being provided with supporting legs 2. Mounted centrally in the tank 1 is a stand pipe 3. The stand pipe 3 extends upwardly through the bottom 4 of the tank 1 to a point adjacent the top 5 of said tank. At its lower end, the stand pipe 3 is connected at 6 to a hard water supply pipe 7. A valve 8 controls the flow of water to the stand pipe 3.

Flanges 10 are fixed in the upper and lower portions of the tank 1 and on the stand pipe 3. Removable plates 11 are mounted on the flanges 10. As illustrated to advantage in Figure 3 of the drawings, the plates 11 comprise perforated segments 12. Sectional metallic rings 13 rest on the marginal portions of the plates 11 and assist in retaining said plates in position on the flanges 10 by gravity. It will be observed that the stand pipe 3 passes upwardly through the plates 11.

The plates 11 divide the tank 1 into what may be considered a lower chamber 14, a comparatively large intermediate chamber 15 and an upper chamber 16. The chamber 15 is for the reception of zeolite between upper and lower layers of fine gravel or course sand. The perforations in the plates 11 are small enough to prevent the passage of such fine gravel or course sand. The sand in the lower portion of the chamber 15 preferably is approximately to the level of the dotted line 17. The upper layer of gravel or sand may be of substantially the same thickness.

A hard water inlet 18, comprising a control valve 19, connects the supply line 7 to the chamber 14 through the bottom 4 of the tank 1. Also connected to the bottom 4 of the tank 1 and communicating with the chamber 14 is a drain line 20 to any suitable point of discharge. A control valve 21 is provided for the drain 20.

A removable closure 22 is threadedly mounted in the top 5 of the tank 1. Mounted on the top 5 of the tank 1 and rigidly secured thereto in any suitable manner is a water heater 23. A soft water pipe 24 connects the inlet of the heater 23 to the top 5 of the tank 1. A control valve 25 is provided for the soft water outlet 24. The lower portion of the heater 23 is provided with a door 26 whereby access may be readily had to the burner, if any, beneath said heater, the valve 25, the closure 22, et cetera.

It is thought that the operation of the device will be readily apparent from a consideration of the foregoing. Briefly, with the valves 19 and 25 open and the valves 8 and 21 closed, water enters the chamber 14 from the line 7 through the inlet 18. The lower perforated plate 11 functions as a baffle for distributing the water which flows upwardly through the gravel or sand and chemical in the chamber 15 into the chamber 16. From the chamber 16 the now softened water flows through the outlet 24 to the heater 23. The outlet 24 may also be connected to various plumbing fixtures. The segments 12 permit the removable plates 11 to be readily installed and removed from the tank 1 through the opening in the top 5 of said tank when the closure 22 is removed. To regenerate the softening agent in the chamber 15, the valves 19 and 25 are closed. The closure 22 is removed and a quantity of salt is placed in the water in the chamber 16 of the tank 1. The closure 22 is then replaced and the valves 8 and 21 are opened. Thus, water enters the chamber 16 from the stand pipe 3 and forms a brine with the salt. This brine flows downwardly through the softening agent in the chamber 15 and leaves the tank 1 through the drain 20. When the operation has been completed, the tank is flushed with water from the line 7 for carrying off the brine. The valves 8 and 21 are then closed again, the valves 19 and 25 are reopened and the softener is again in operation.

Figure 4:
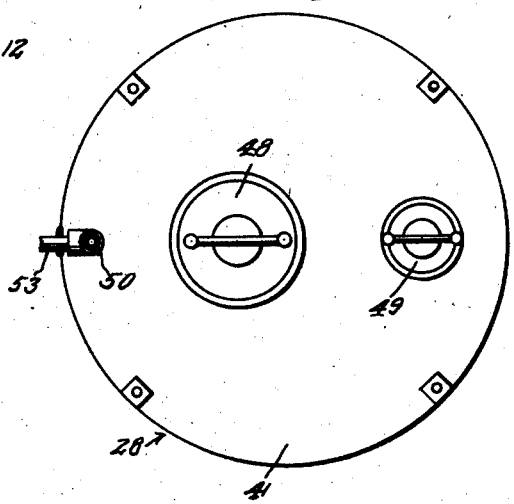
Figure 4 is a top plan view of another form of the invention.
Figure 6:
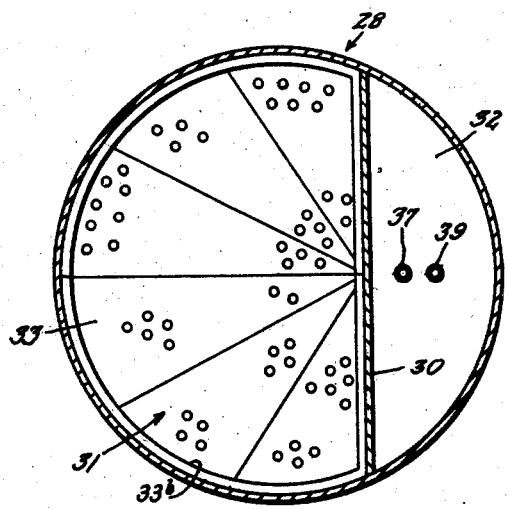
Figure 6 is a view in horizontal section, taken substantially on the line 6—6 of Figure 5.
Figure 5:
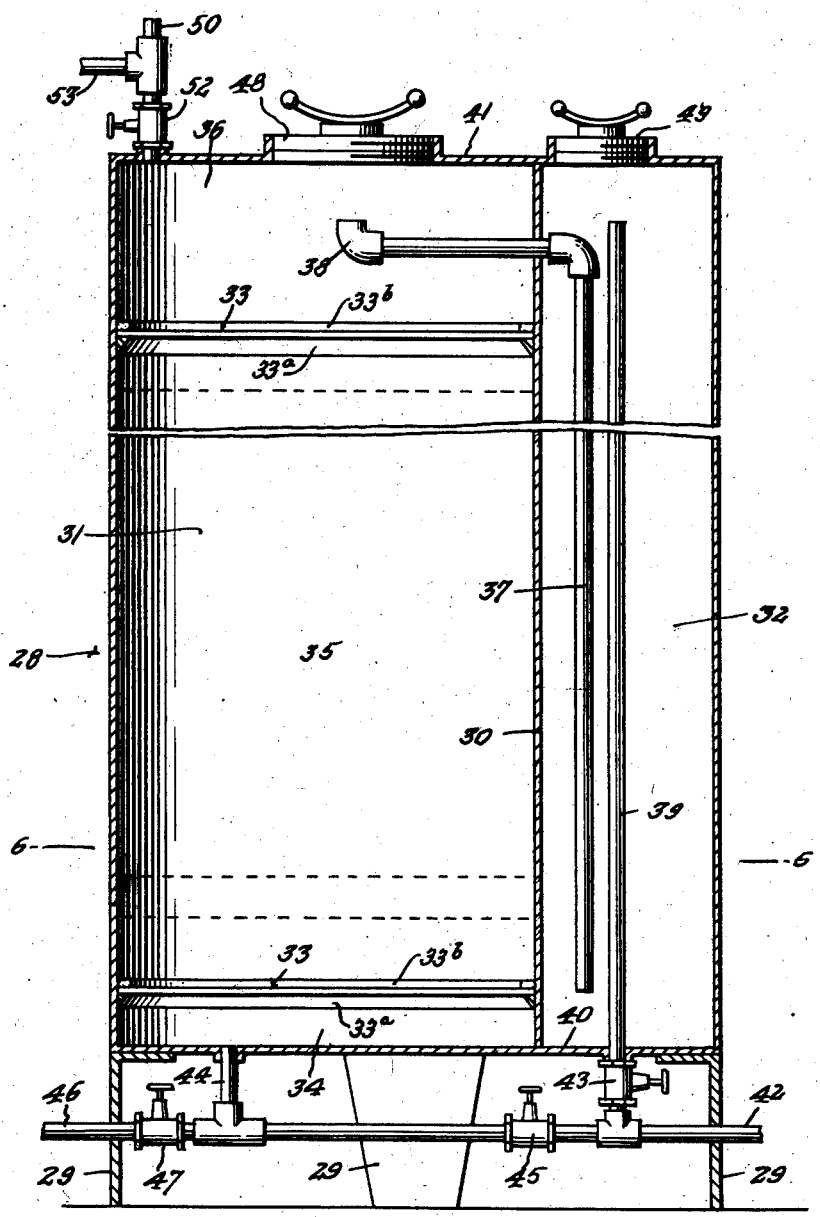
Figure 5 is a vertical sectional view through the modification.

In the embodiment of the device illustrated in Figures 4, 5 and 6 of the drawings, reference character 28 designates a cylindrical tank comprising supporting legs 29. A vertical, off-center partition 30 provides comparatively large and small chemical and brine chambers 31 and 32, respectively, in the tank 28. As best seen in Figure 6 of the drawings, the chambers 31 and 32 are segmental in horizontal section.

Mounted in the upper and lower portions of the chamber 31 are perforated, removable segmental plates 33. With the exception of the specific shape of their segments, the plates 33 are substantially similar in their construction and mounting to the plates 11. The plates 33 have supporting flanges 33a and a sectional retaining ring 33b and subdivide the chamber 31 into lower, intermediate and upper compartments 34, 35 and 36, respectively.

A pipe 37 passes through the upper portion of the partition 30 for drawing brine from the lower portion of the chamber 32 into the upper portion of the compartment 36. The pipe 37 is provided with an upturned discharge end 38 for directing the brine upwardly as it enters the compartment 36.

A stand pipe 39 extends upwardly in the brine chamber 32 through the bottom 40 of the tank 28, said stand pipe 39 terminating adjacent the top 41 of the tank. At its lower end, the stand pipe 39 is connected to a hard water supply line 42. A control valve 43 is provided for the stand pipe 39. A pipe 44 connects the line 42 to the compartment 34 of the softening chamber 31. A valve 45 is interposed in the line 42 between the pipe 44 and the stand pipe 39. Also connected to the pipe 44 is a drain 46 which is provided with a control valve 47.

Comparatively large and small removable closures 48 and 49 provide access, respectively, to the chambers 31 and 32 of the tank 28, said closures being threadedly mounted in the top 41 of said tank. A soft water outlet 50 connects the compartment 36 of the chamber 31 to a suitable water heater to be mounted on top of the tank 28, said outlet 50 being provided with a control valve 52. A line 53 connects the outlet 50 with various plumbing fixtures.

In operation, the valves 43 and 47 are normally closed while the valves 45 and 52 are open. Thus, hard water from the supply line 42 enters the chamber 31 of the tank 28 and passes upwardly through the softening agent and gravel or sand in the compartment 35. The softened water leaves the compartment 36 through the outlet 50. To regenerate the softening agent in the chamber 31 of the tank 28, the valve 52 is closed and the closure 49 is removed to permit the chamber 32 to fill with water to the desired level from the chamber 31 through the pipe 37. When the water in the chamber 32 rises to the desired level, the valve 45 is closed. Salt is then placed in the chamber 32 for forming a brine solution. The valve 47 is opened for drawing the brine from the chamber 32 into the compartment 36 through the pipe 37, said brine flowing downwardly through the zeolite in the chamber 31 and being drained off through the pipes 44 and 46. The closure 49 is then replaced. The valve 43 is then opened for the passage of water under pressure through the pipe 39 into the chamber 32. This water flows downwardly in the chamber 32 and upwardly in the pipe 37 into the compartment 36. The water then flows downwardly in the chamber 31 and discharges through the pipes 44 and 46, thus thoroughly flushing the apparatus.

It is believed that the many advantages of a water softener constructed in accordance with the present invention will be readily understood, and although preferred embodiments of the apparatus are as illustrated and described, it is to be understood that further modifications and changes in the details of construction may be resorted to which will fall within the scope of the invention as claimed.

What is claimed is:

1. A water softener comprising a tank, vertically spaced perforated plates for the reception of a softening agent therebetween mounted in fixed position within said tank, a valve-controlled drain communicating directly with the bottom of the tank beneath said plates, a valve-controlled inlet pipe communicating directly with the bottom of the tank beneath said plates, means to supply water to the tank above said plates including a valve-controlled stand pipe connected to the inlet pipe and extending upwardly into the tank through the bottom thereof to a point adjacent the top of said tank, said stand pipe passing through the perforated plates, and a valve-controlled outlet pipe connected to the top of the tank.

2. A water softener of the character described comprising a tank, said tank including a top and bottom, a vertical partition in the tank providing chambers therein, vertically spaced perforated plates, for the reception of a softening agent therebetween, mounted in one of the chambers, an inlet pipe for unsoftened water passing through the upper portion of the partition and connecting the upper portion of said one chamber above said perforated plates with the lower portion of the other chamber, a valve-controlled stand pipe in said other chamber extending upwardly through the bottom of the tank to a point adjacent the top thereof, a water supply line connected to the stand pipe, a pipe connecting the supply line to the lower portion of said one chamber, a valve interposed in the supply line between the stand pipe and the second-named pipe, a valve-controlled drain line connected to the second-named pipe, and a valve-controlled outlet pipe for softened water connected to the upper portion of said one chamber.

3. In a water softener of the character described, an upright tank having a top opening provided with a removable closure, means to selectively supply water to the top or bottom of said tank including a valve-controlled stand pipe extending upwardly into the tank through the bottom thereof to a point adjacent the top of the same, vertically spaced flanges mounted in the tank, vertically spaced perforated plates for the reception therebetween of a water softening agent removably mounted within said tank in fixed positions, said plates including separate perforated segments resting upon said flanges, said segments being of such size as to be individually removable through said top opening, sectional metallic rings removably resting on the marginal portions of the plate for retaining said plates in position on the flanges by gravity, the sections of said rings being separate and removable through said top opening, and a valve-controlled outlet pipe connected to the top of said tank.

ALEXANDER R. FORSYTH.